Figure 1:
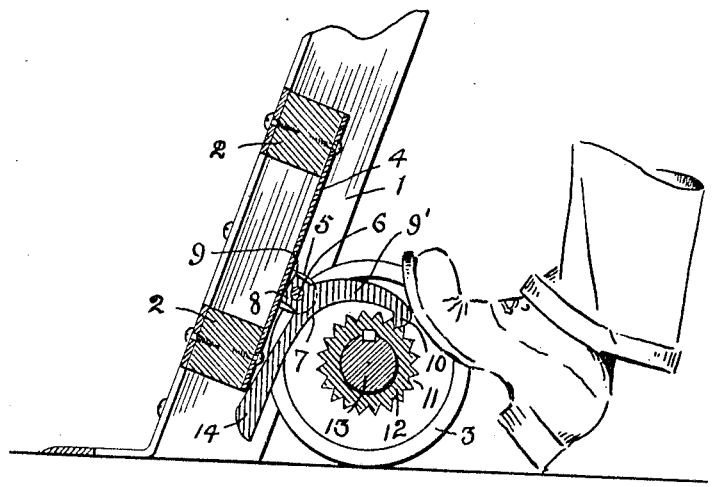

A. O. EVENSON.
HAND TRUCK.
APPLICATION FILED SEPT. 17, 1917.

1,270,024.

Patented June 18, 1918.

INVENTOR.
Adolph O. Evenson.
BY Geo Stevens,
ATTORNEY.

UNITED STATES PATENT OFFICE.

ADOLPH O. EVENSON, OF DULUTH, MINNESOTA.

HAND-TRUCK.

1,270,024.

Specification of Letters Patent.

Patented June 18, 1918.

Application filed September 17, 1917. Serial No. 191,769.

*To all whom it may concern:*

Be it known that I, ADOLPH O. EVENSON, a citizen of the United States, residing at Duluth, in the county of St. Louis and State of Minnesota, have invented certain new and useful Improvements in Hand-Trucks, of which the following is a specification, reference being had therein to the accompanying drawing.

This invention consists of certain new and useful improvements in attachments for hand trucks and relates particularly to that class of truck used in the manual handling of comparatively small packages of freight and the like which are transported from place to place by hand upon two-wheeled trucks.

The object of the invention is to provide simple and inexpensive means for temporarily holding the wheels of the truck in a locked position to keep the truck from moving when a load is being applied thereto.

It is customary when loading a truck of this character to raise the handles until the forward end of the truck rests upon the floor when the burden, whatever it may be, is caught upon the projecting lip of the truck and both the burden and the truck are simultaneously brought to the proper position for transporting. In this operation of initially engaging the truck and the burden it is the custom for the operator to place the toe of one foot against either one of the wheels or the axle of the truck to hold the latter stationary until the burden is properly balanced thereupon when he removes his foot to proceed with the balance of the operation.

In this operation, having no means of positively holding the wheels against rotation, it becomes very hard to accomplish the desired results and to overcome these difficulties is a further object of my present invention.

Figure 2:
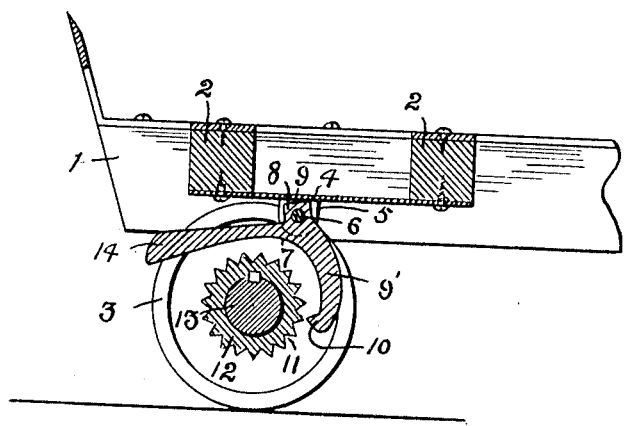

Referring to the accompanying drawings forming part of this application and in which like reference numerals indicate like parts:

Figure 1 is a central vertical section of a fragmental portion of a truck equipped with the invention when in action, and Fig. 2 is an identical view showing the attachment embodying the invention in an inactive position.

1 represents one of the side pieces of the frame work of the truck and 2—2 represents two of the cross pieces as commonly found in hand truck construction.

To the under side of the cross pieces 2 and located centrally intermediate of the wheels 3 of the truck is secured a strip 4 having formed integral therewith or attached in any desired manner a pair of depending lugs one of which is shown at 5, they being spaced apart and pivotally carry therebetween, as at 6, the pawl 7. The pawl is formed with a rectangular shaped hub portion 8 about the pivot 6, the upper flat face 9 of which hub portion is spaced a distance from the face of the strap 4 to provide for a limited rocking movement only of the pawl in either direction, such movement being terminated in either direction by the respective corner of the hub portion engaging the face of the strap 4 and thus retarding further motion thereof.

The head end 9' of the pawl has formed upon its outer extremity a protruding V-shaped dog portion 10, which is designed to engage similarly shaped notches 11 formed in the peripheral edge of the ratchet wheel 12, rigidly fixed to the axle 13, upon which the wheels 3 are non-rotatably fixed.

By this arrangement the head end of the pawl may be forcibly applied by one foot of the operator to the ratchet wheel with the dog 10 engaged within one of the notches 11 and by which the wheels 3 are easily held against rotation.

When pressure is removed from the head of the pawl the latter will be normally disengaged from the ratchet wheel and to accomplish which the tail 14 of the pawl is made of sufficient length and weight to normally counteract the weight of the head end thereof and hold the pawl entirely free from the ratchet wheel.

However it is evident that the dog 10 and the notches 11, being V-shaped, positively insure against any possible catching of the former in the latter to the extent of interfering with the normal working of the truck.

While I have shown and described a specific form of embodiment of the invention it is evident that various modifications and changes in construction within the scope of the invention may be resorted to without departing from the spirit thereof.

Having thus described my invention what

I claim as new and desire to secure by Letters Patent, is:

The combination with a hand truck having an axle with wheels non-rotatably fixed thereto, of a ratchet wheel fixed to the axle intermediate of the wheels, a pawl suspended from the truck above the ratchet wheel and means whereby the pawl is operated in one direction by gravity and in the opposite direction manually.

In testimony whereof I hereunto affix my signature in the presence of two witnesses.

ADOLPH O. EVENSON.

Witnesses:
JOHN A. FORSMAN,
JAS. T. MORIN.

Copies of this patent may be obtained for five cents each, by addressing the "Commissioner of Patents, Washington, D. C."